(12) United States Patent
St-Pierre et al.

(10) Patent No.: US 12,473,091 B2
(45) Date of Patent: *Nov. 18, 2025

(54) PASSENGER SEAT CRASH SAFETY SYSTEM

(71) Applicant: Textron Innovations Inc., Providence, RI (US)

(72) Inventors: Jean St-Pierre, North Richland Hills, TX (US); William Morin, Montreal (CA)

(73) Assignee: Textron Innovations Inc., Providence, RI (US)

( * ) Notice: Subject to any disclaimer, the term of this patent is extended or adjusted under 35 U.S.C. 154(b) by 102 days.

This patent is subject to a terminal disclaimer.

(21) Appl. No.: 18/380,250

(22) Filed: Oct. 16, 2023

(65) Prior Publication Data

US 2024/0034473 A1 Feb. 1, 2024

Related U.S. Application Data

(63) Continuation of application No. 17/362,252, filed on Jun. 29, 2021, now Pat. No. 11,814,176.

(51) Int. Cl.
*B64D 11/06* (2006.01)
*B64C 1/20* (2006.01)

(52) U.S. Cl.
CPC .......... *B64D 11/0619* (2014.12); *B64C 1/20* (2013.01); *B64D 11/0696* (2013.01)

(58) Field of Classification Search
CPC .... B64D 11/0619; B64D 11/0696; B64C 1/20
See application file for complete search history.

(56) References Cited

U.S. PATENT DOCUMENTS

| | | | | |
|---|---|---|---|---|
| 7,143,989 B2* | 12/2006 | Looker | ................. | B65D 90/00 248/346.02 |
| 7,857,259 B2* | 12/2010 | Baatz | ....................... | B64C 1/20 244/118.6 |
| 7,926,762 B2* | 4/2011 | Oetken | .................... | B64D 9/00 410/106 |
| 8,191,829 B2* | 6/2012 | Erickson | ............... | B64D 11/00 244/118.5 |
| 8,870,119 B2* | 10/2014 | Baatz | ....................... | B64C 1/20 244/118.6 |
| 9,481,467 B2* | 11/2016 | Oleson | ..................... | B64C 1/18 |
| 9,738,402 B2* | 8/2017 | Brown | ..................... | B64C 1/20 |
| 10,549,859 B2* | 2/2020 | Movsesian | ............... | B64C 1/20 |
| 10,654,573 B2* | 5/2020 | Movsesian | ............... | B60N 2/01 |
| 10,836,496 B2* | 11/2020 | Movsesian | ......... | B64D 11/0696 |
| 11,203,407 B2* | 12/2021 | Sjostrom | ................. | B64C 1/18 |
| 11,208,213 B2* | 12/2021 | Sankrithi | ................ | B64C 1/18 |

(Continued)

*Primary Examiner* — Joseph W Sanderson
(74) *Attorney, Agent, or Firm* — Frost Brown Todd LLP

(57) ABSTRACT

A safety system for aircraft passenger seats is described. A pallet that can be removably coupled to seats can also be removably coupled to the aircraft floor and one or more brackets, tension fittings, or machined straps that can be coupled to structural beams or components in an aircraft. A keel tension fitting can be attached to a keel beam and then be coupled to the pallet and thereby the seats. By attaching to the keel beam the safety system allows the seating arrangement (pallet and seats) to withstand greater stresses and forces, resulting in increased safety.

7 Claims, 13 Drawing Sheets

(56) References Cited

U.S. PATENT DOCUMENTS

| | | | |
|---|---|---|---|
| 11,286,050 B2* | 3/2022 | Grether | B64D 11/0696 |
| 11,814,176 B2* | 11/2023 | St-Pierre | B64C 1/20 |
| 2004/0173723 A1* | 9/2004 | Looker | B64C 1/20 |
| | | | 248/346.02 |
| 2007/0080258 A1* | 4/2007 | Baatz | B64C 1/20 |
| | | | 244/118.6 |
| 2007/0095978 A1* | 5/2007 | Oetken | B64D 9/003 |
| | | | 244/118.1 |
| 2010/0116933 A1* | 5/2010 | Erickson | B64D 11/0696 |
| | | | 248/503.1 |
| 2010/0314494 A1* | 12/2010 | Gasser | B64D 11/0696 |
| | | | 244/131 |
| 2011/0068226 A1* | 3/2011 | Baatz | B64C 1/20 |
| | | | 244/118.6 |
| 2015/0108273 A1* | 4/2015 | Oleson | B64C 1/18 |
| | | | 244/120 |
| 2016/0107753 A1* | 4/2016 | Toktas | B64D 11/0696 |
| | | | 244/119 |
| 2016/0244186 A1* | 8/2016 | Brown | B64D 9/00 |
| 2018/0281971 A1* | 10/2018 | Sankrithi | B64D 11/0648 |
| 2019/0118952 A1* | 4/2019 | Movsesian | B64D 11/0696 |
| 2019/0118953 A1* | 4/2019 | Movsesian | B64D 11/0696 |
| 2019/0118954 A1* | 4/2019 | Movsesian | B60N 2/06 |
| 2019/0248499 A1* | 8/2019 | Grether | B64D 11/0696 |
| 2021/0206467 A1* | 7/2021 | Sjostrom | B64C 1/20 |
| 2022/0001984 A1* | 1/2022 | Smallhorn | B64D 9/003 |
| 2022/0169391 A1* | 6/2022 | Chenicheri Vadakkil | B64D 11/0696 |

\* cited by examiner

PASSENGER SEAT CRASH SAFETY SYSTEM

CROSS REFERENCE TO RELATED DATA

This application is a continuation of U.S. patent application Ser. No. 17/362,252, filed Jun. 29, 2021, titled Passenger Seat Crash Safety System, now U.S. Pat. No. 11,814,176 the contents of which are hereby incorporated herein in its entirety.

TECHNICAL FIELD

The present disclosure is directed to aircraft and more particularly to protective seating for aircraft.

BACKGROUND OF THE INVENTION

Crash safety and protective seating are becoming more important as commercial aircraft, such as air taxis, become more popular. Safety standards were recently strengthened by the FAR 29 2018 standards. For seating arrangements to be acceptable according to safety standards, they must withstand large static loads and occupant dynamic loads.

BRIEF SUMMARY OF THE INVENTION

One possible embodiment of the present disclosure is a seating system for an aircraft comprising: a pallet configured to cover at least a portion of an aircraft floor and comprising; one or more receptacles configured to receive an attachment mechanism from a seat; a first plurality of holes configured for attachment to the aircraft floor by a first plurality of bolts; and a second plurality of holes configured for attachment by a second plurality of bolts; and a keel tension fitting comprising; one or more horizontal flanges comprising one or more holes and configured to be coupled to a bottom side of the aircraft floor and to the pallet by the second plurality of bolts; one or more vertical flanges comprising two or more holes and configured to be coupled to a keel beam of the aircraft by a third plurality of bolts.

Another possible embodiment can comprise a passenger seat safety system for an aircraft comprising: a pallet configured to be coupled to an aircraft floor and to be coupled to one or more passenger seats, the pallet comprising a first attachment means; and a keel tension fitting configured to be coupled to a keel beam of the aircraft and to an underside of the aircraft floor, the keel tension fitting comprising a second attachment means configured to be coupled to the first attachment means of the pallet.

Another possible embodiment is a method of securing passenger seats to an aircraft, comprising: coupling a pallet to an aircraft floor, the pallet comprising a plurality of receptacles configured to receive one or more passenger seats and further comprising a first attachment means; coupling a keel tension fitting to a keel beam of the aircraft and to an underside of the aircraft floor, the keel tension fitting configured to extend along an edge where the keel tension fitting meets the underside of the aircraft floor; coupling the keel tension fitting to the pallet using the first attachment means; and coupling the one or more passenger seats to the pallet.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawings, in which.

DETAILED DESCRIPTION OF THE INVENTION

Figure 1:
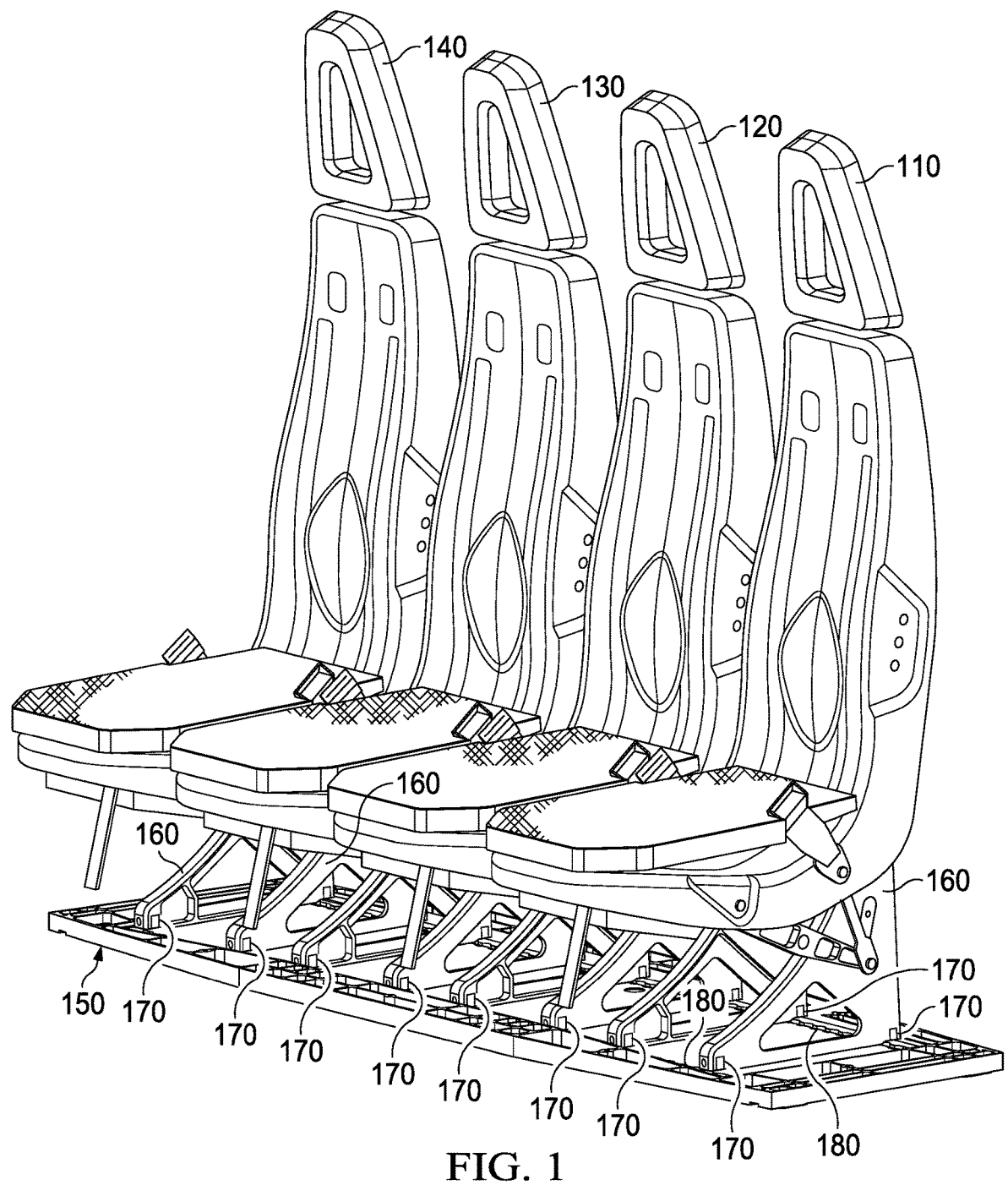
FIG. 1 is a diagram of a seating system under the present disclosure.

Referring now to FIG. 1, a seating embodiment under the present disclosure can be seen. Seats 110-140 can attach to pallet 150. Attachment can occur via locks 170 on the bottom of legs 160. Locks 170 are preferably detachable and can lever into track 180. Track 180 can comprise a plurality of openings or attachment spots on a pallet 150. Track 180 preferably includes a plurality of openings for engagement with locks 170. Seats 110-140 can be locked into place within track 180 in a variety of arrangements because of the multiple openings allowing for engagement with locks 170.

Figure 2:
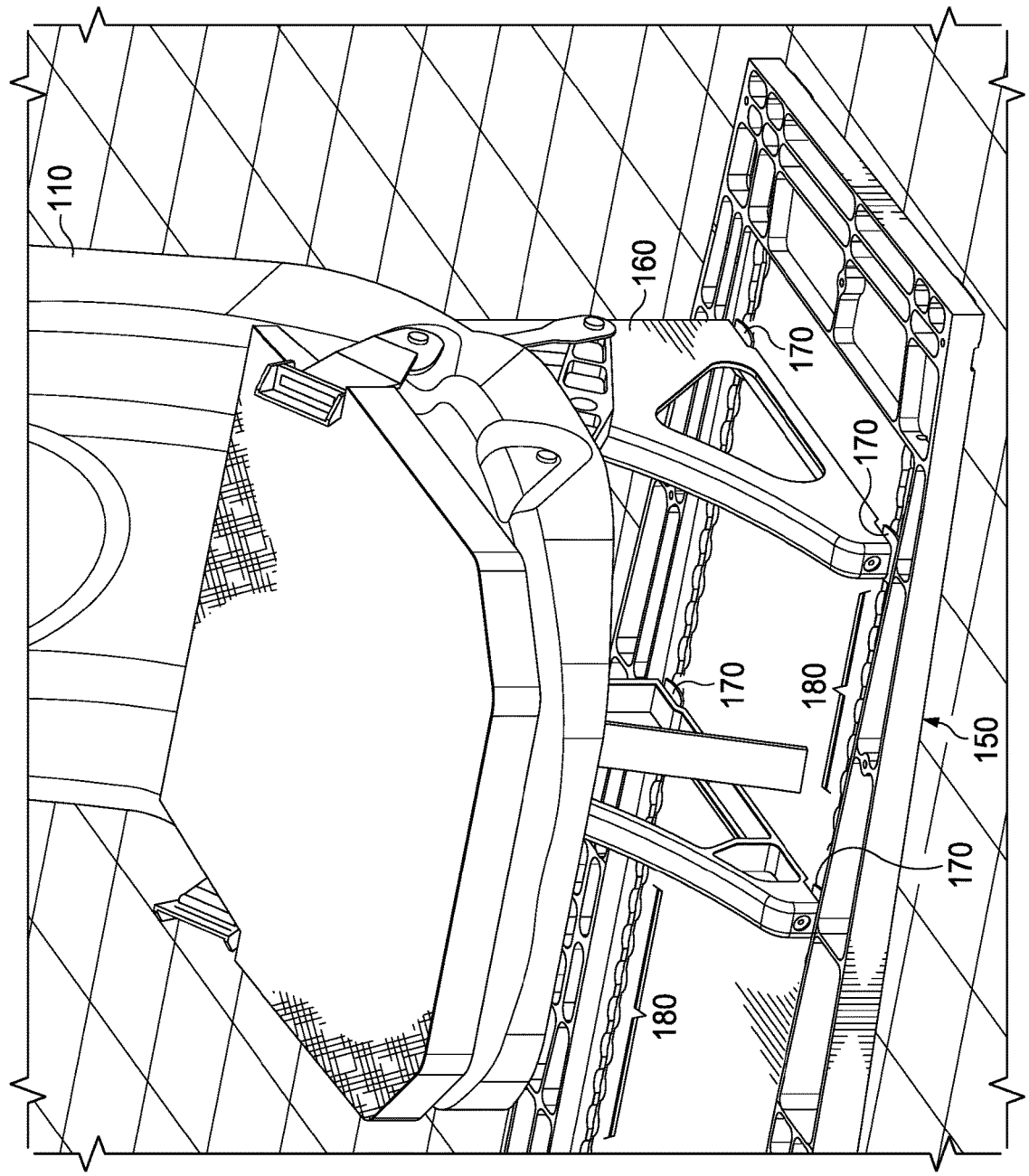
FIG. 2 is a diagram of a seating system under the present disclosure.
Figure 3:
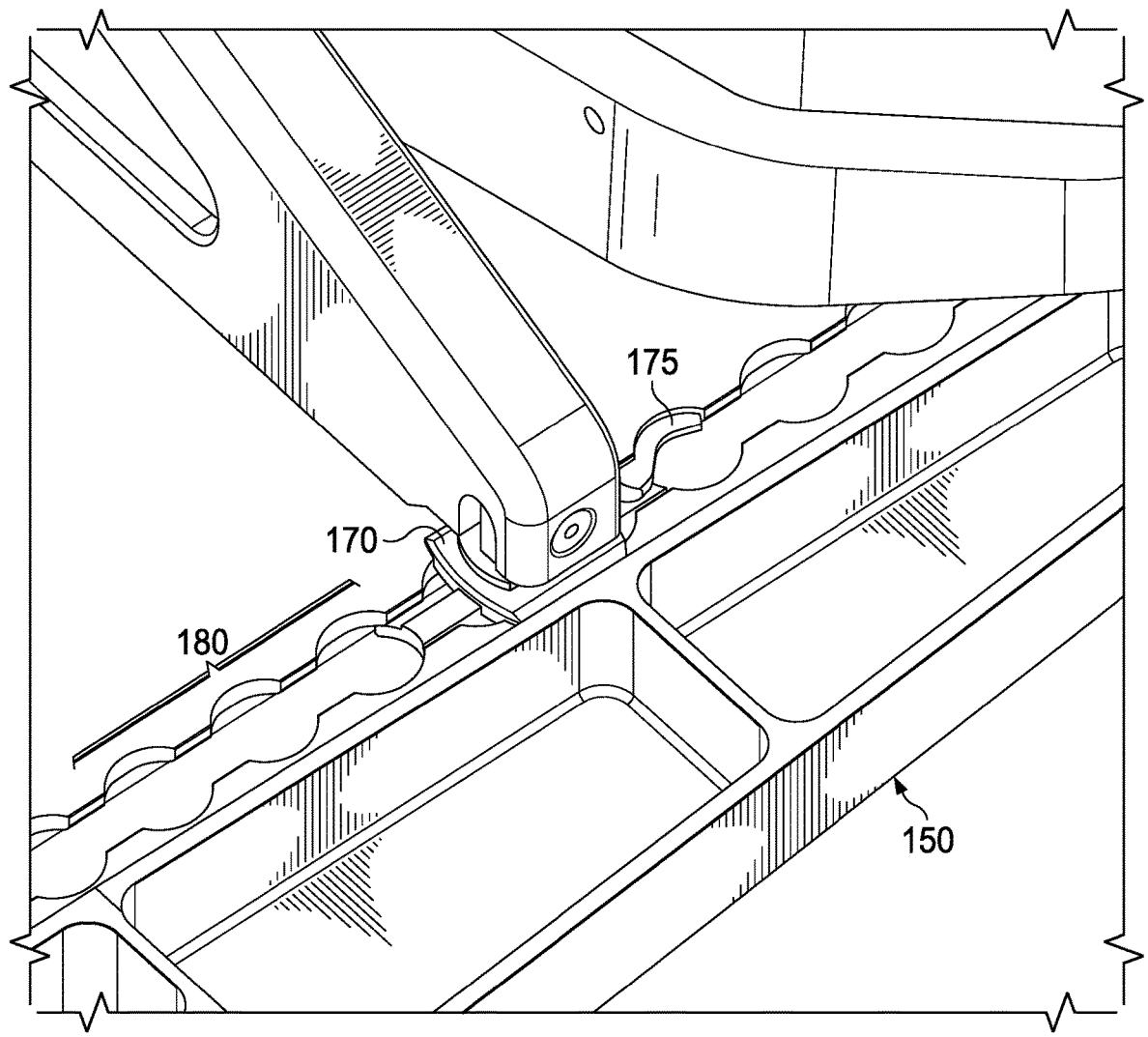
FIG. 3 is a diagram of a seating system under the present disclosure.

FIG. 2 shows a similar embodiment to FIG. 1. Tracks 180 can be seen with locks 170 on the bottom of seat 110. When a user wishes to move seat 110, locks 170 can be unlocked, detached, and moved elsewhere along tracks 180 within pallet 150. FIG. 3 shows a closer view of track 180 and lock 170. Locks 170 comprises rounded portions that can fit within the rounded openings of track 180. A lever 175 can be pulled in order to depress the edges of lock 170 and disengage from the edges of track 180, freeing the seat to be moved. Various locking and attachment mechanisms are available to use in keeping with the teachings of the present disclosure.

Figure 4:
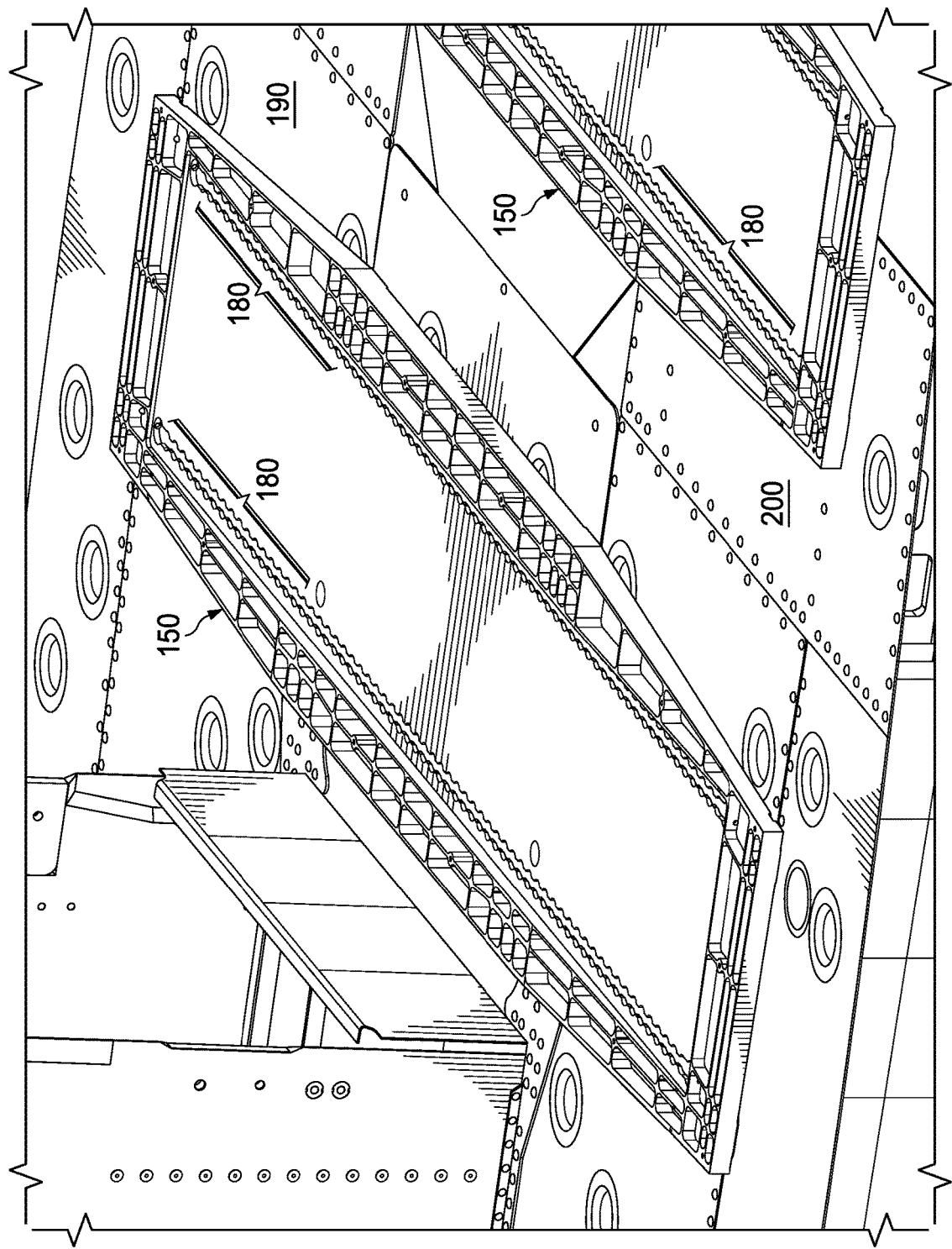
FIG. 4 is a diagram of a seating system under the present disclosure.
Figure 5:
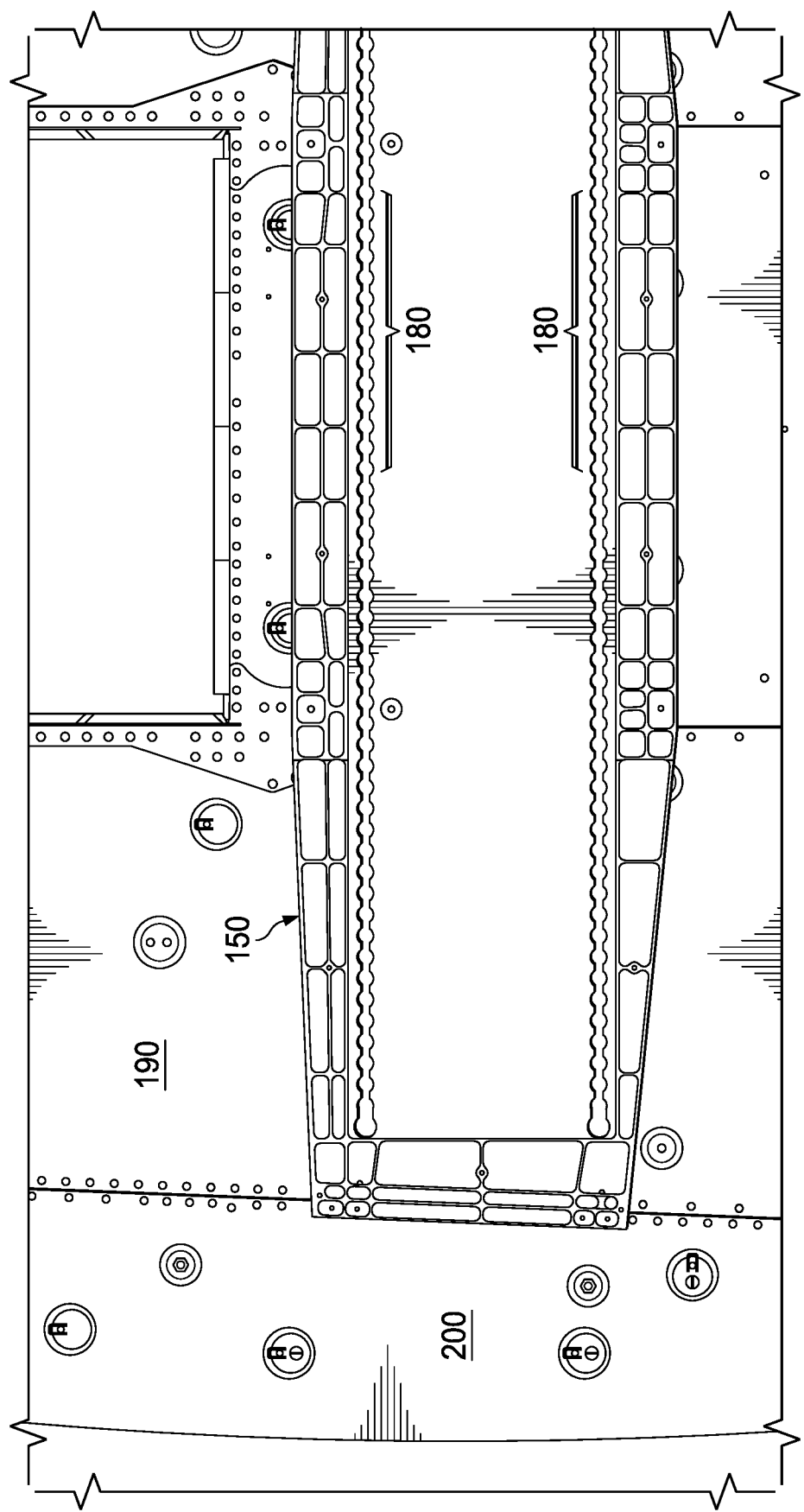
FIG. 5 is a diagram of a seating system under the present disclosure.

FIG. 4 shows pallets 150 in use on the floor 190 of an aircraft 200. An aircraft 200 can comprise multiple pallets 150. Tracks 180 can be seen in the pallets 150. Seats can be arranged to face each other from different floor plates 150, or be arranged to face the same way in rows. Even on a single pallet 150, the seats can be arranged in a variety of ways. The tracks 180 can be arranged in a variety of geometries to allow for various seat arrangements. FIG. 5 shows another view of the pallets 150 and floor 190 of FIG. 4. Tracks 180 can be seen in pallet 150 that is attached to floor 190 of aircraft 200.

Figure 6:
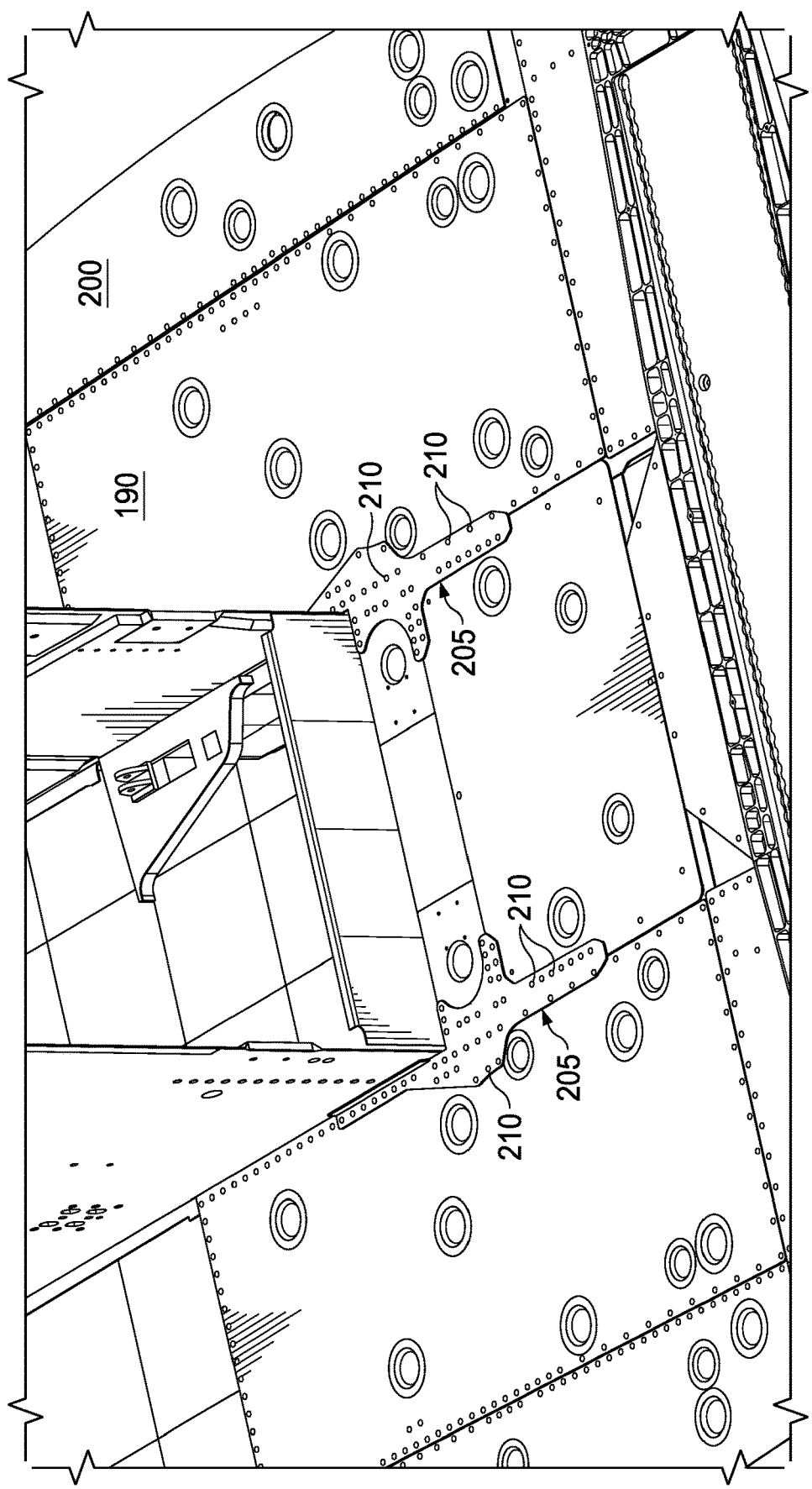
FIG. 6 is a diagram of a seating system under the present disclosure.
Figure 7:
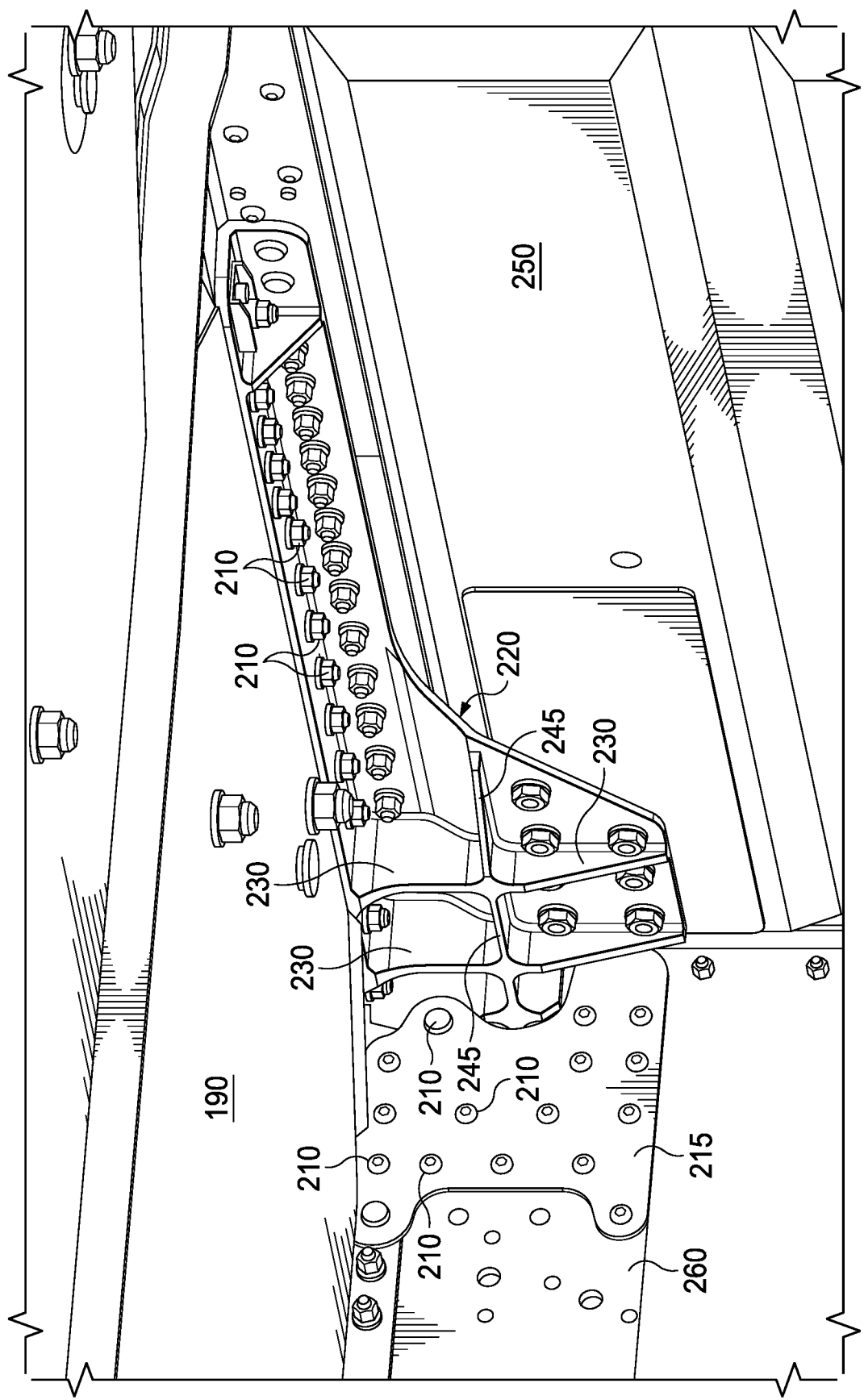
FIG. 7 is a diagram of a seating system under the present disclosure.

Increased safety and strength for pallets 150 can be achieve by coupling pallet 150 to a plurality of tension fittings and machined straps that attach to floor 190 and other structural components of aircraft 200. A view of machine straps 205 can be seen in FIG. 6. Bolts 210 can be used at various parts of machine straps 205 to attach to floor 190 and to other components shown in FIG. 7. FIG. 7 shows tension fittings and other bracket embodiments beneath floor 190. Keel tension fitting 220 can be attached to keel beam 250. Bulk bracket 215 can be attached to bulkhead 260.

Bulk bracket 215 can comprise a modification of the existing bulkhead 260 to accommodate keel tension fitting 220. Vertical ribs 230 and horizontal ribs 245 add increased compressive and shear resistance. Bolts 210 can be used at various points to attach keel tension fitting 220, 215 to keel beam 250, bulkhead 260, floor 190, and machine straps 205 of FIG. 6.

Figure 8:
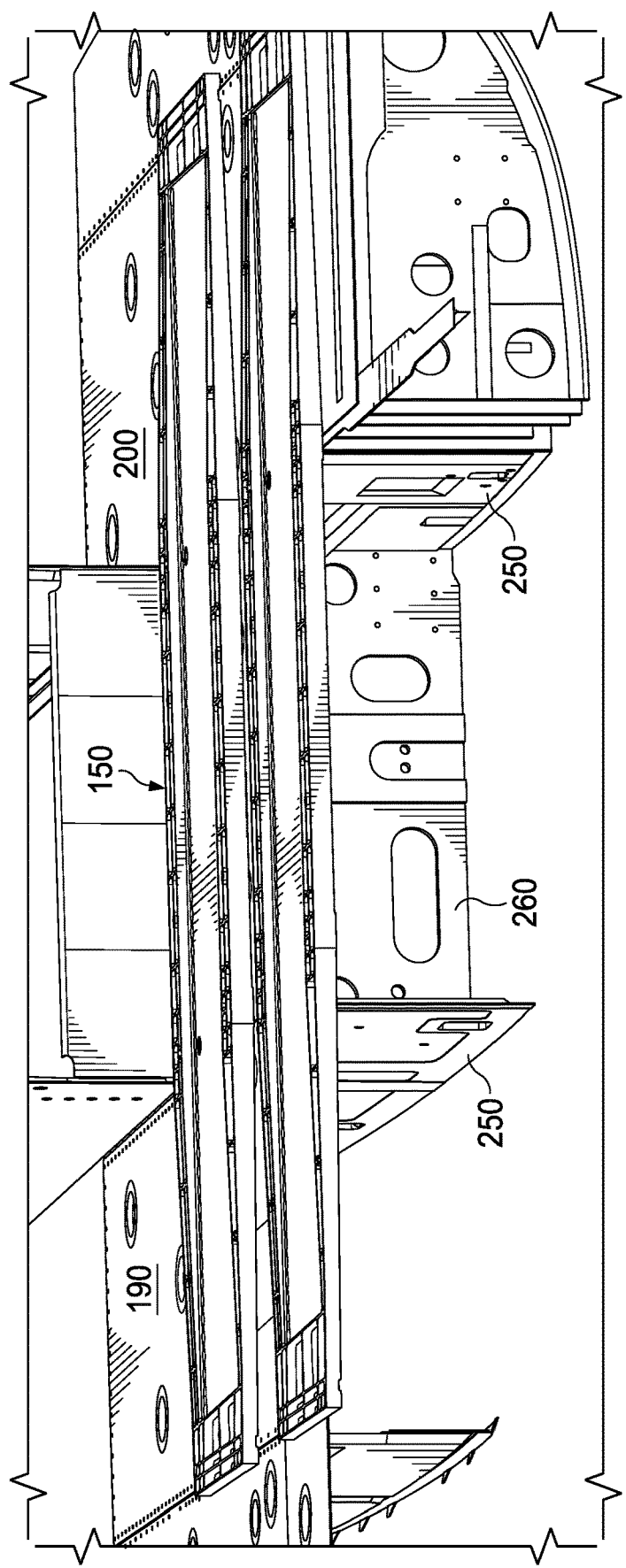
FIG. 8 is a diagram of a seating system under the present disclosure.
Figure 9:
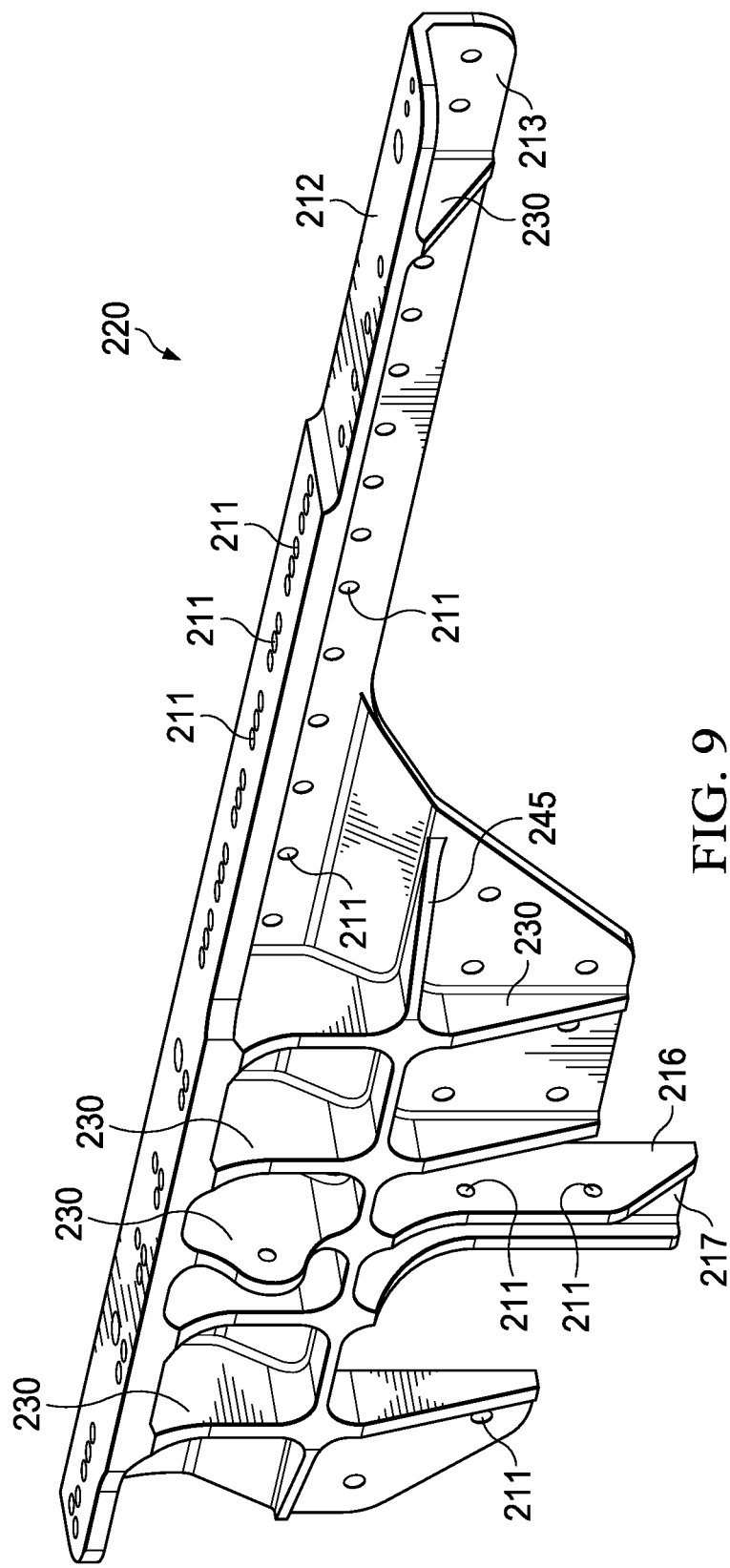
FIG. 9 is a diagram of a seating system under the present disclosure.

FIG. 8 shows broader view of aircraft 200, showing floor 190, pallet 150, bulkhead 260 and keel beams 250. The brackets shown in FIG. 6 and FIG. 7 preferably attach to both keel beams 250, as well as bulkhead 260. Various aircraft may have different specific layouts of structural beams and structures than the specific layout of bulkhead 260 and keel beams 250 shown in FIG. 8. But the teachings of the present disclosure can be applied across a variety of embodiments. For example, an embodiment of a keel tension fitting 220 is shown in FIG. 9. The specific location of ribs or flanges on keel tension fitting 220 is related to the aircraft 200, floor 190, bulkhead 260 and keel beam 250 described above. But the specific layout of ribs, flanges, and other components can be varied to different aircraft embodiments.

As shown in FIG. 9, keel tension fitting 220 comprises a plurality of bolt holes 211 for use with bolts 210 for attachment to structural components of aircraft 200 or additional brackets. Vertical ribs 230 add tension and compression strength and horizontal rib 245 add shear and torsional strength. Floor flange 212 can comprise a plurality of holes 211 for attachment to a floor 190 and/or additional brackets. Keel flange 213 can comprise a plurality of holes 211 for attachment to keel beam 250 and/or additional brackets. Bulkhead flange 216 can comprise a plurality of holes for attachment to the bulkhead 260 and/or additional brackets. Vertical flange 217 can comprise a plurality of holes for attachment to keel beam 250 and/or additional brackets.

Figure 10:
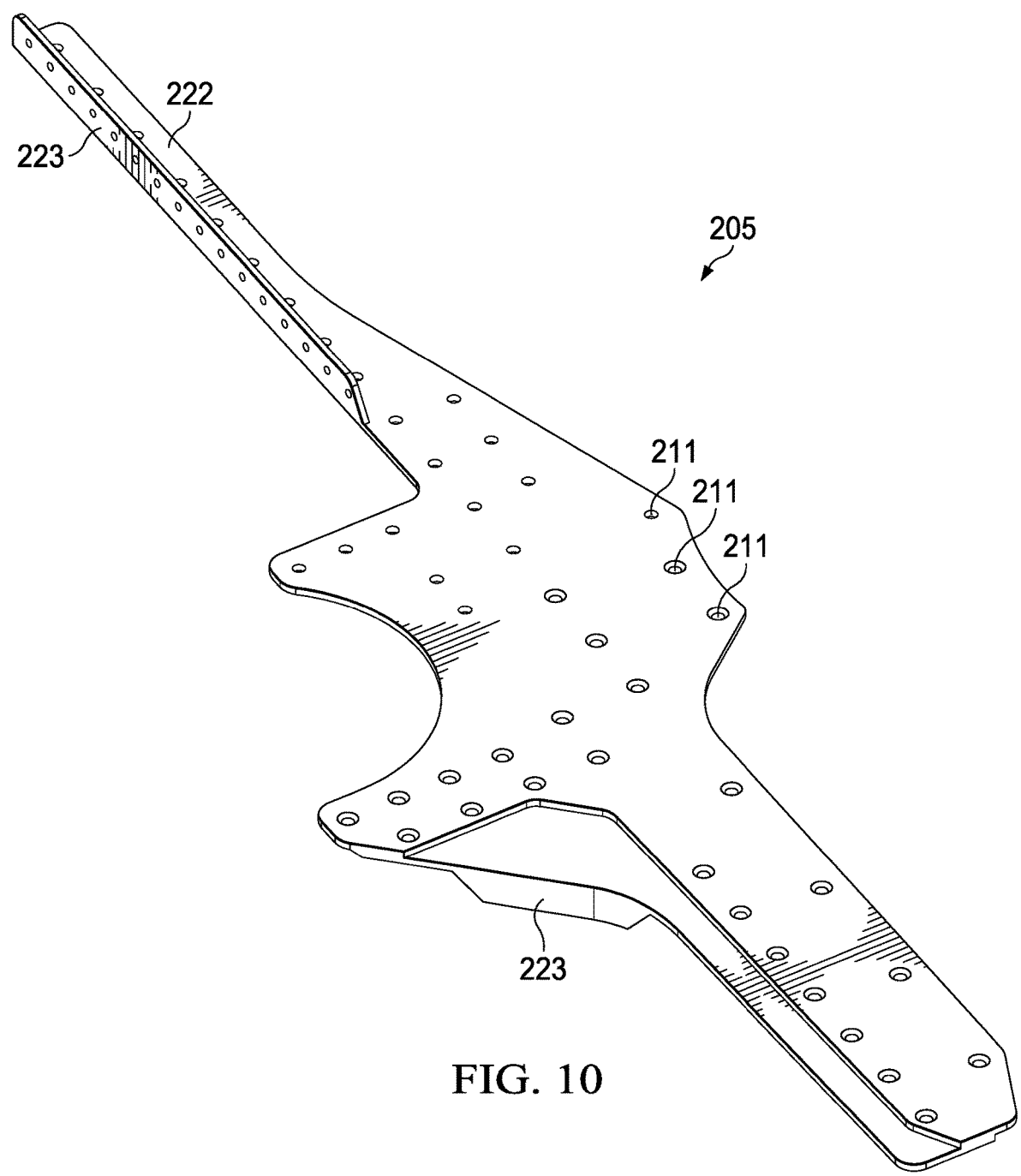
FIG. 10 is a diagram of a seating system under the present disclosure.
Figure 11:
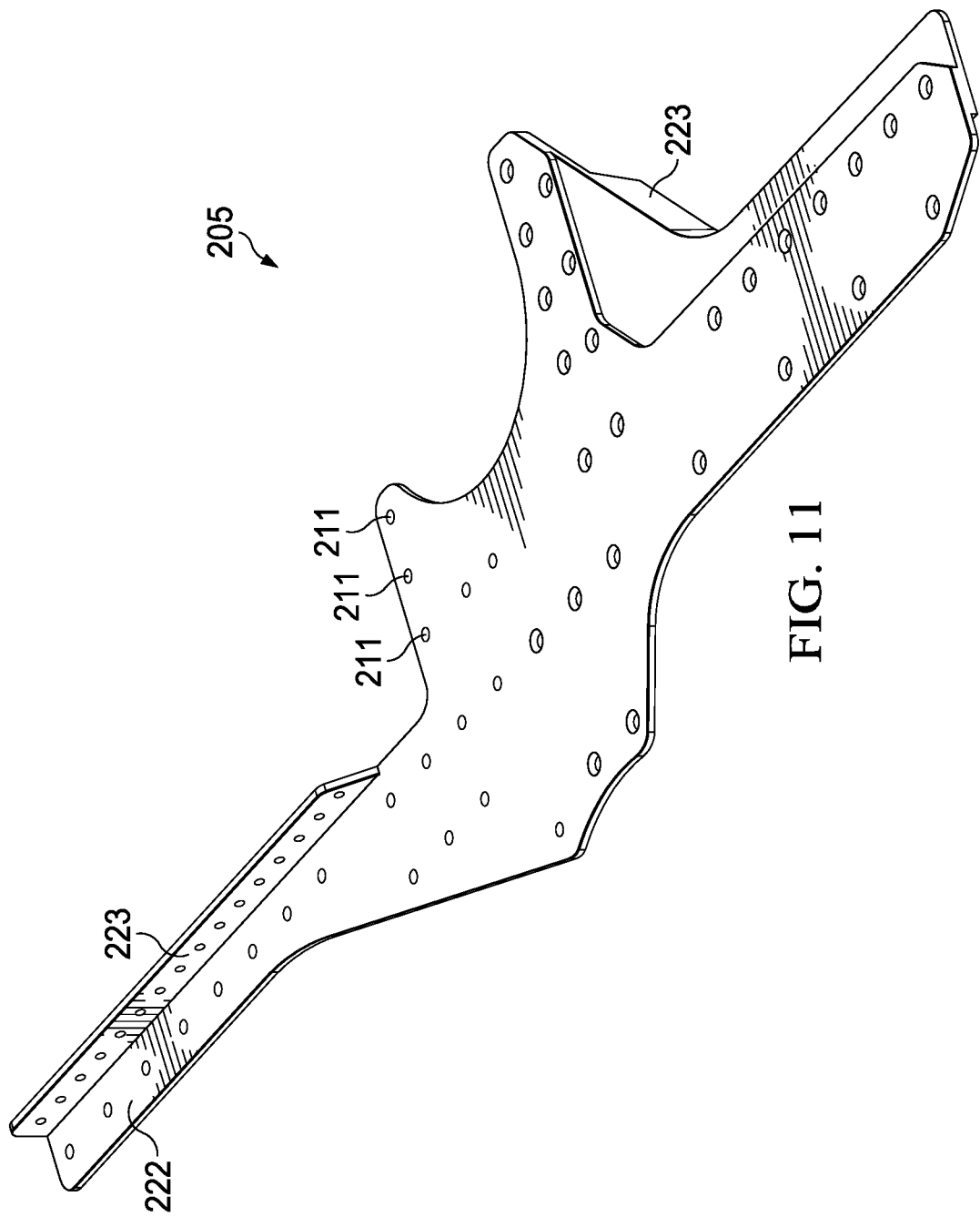
FIG. 11 is a diagram of a seating system under the present disclosure.

FIGS. 10 and 11 shows possible embodiments of machine straps 205. Holes 211 can receive bolts for attachment to floor 190, additional brackets, or other structural components. Vertical flanges 223, and horizontal flanges 222 can comprise a plurality of holes 211 for attachment to structural components and/or additional brackets. Machine straps 205 are shown in one embodiment with a specific geometry based on a specific aircraft 200 embodiment. Other specific shapes, number and placement of holes, number and placement of flanges, and other dimensions are possible in keeping with the teachings of the present disclosure.

Figure 12:
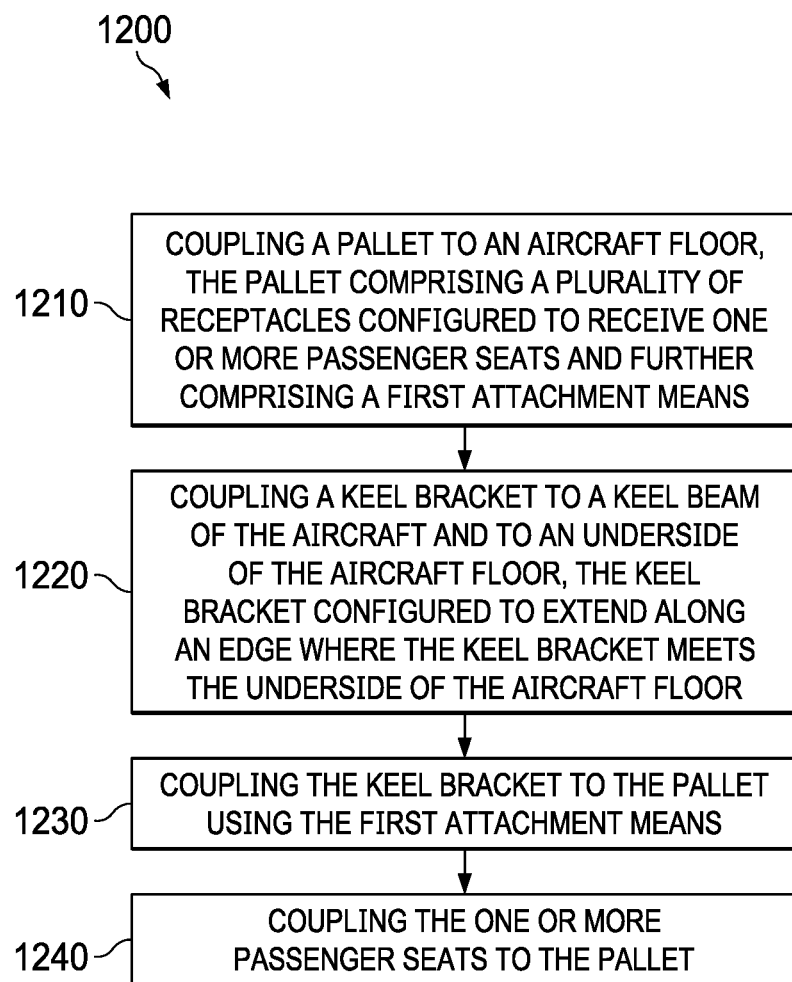
FIG. 12 is a diagram of a method embodiment under the present disclosure.

FIG. 12 shows a possible method embodiment 1200 for securing passenger seats to an aircraft under the present disclosure. Step 1210 is coupling a pallet to an aircraft floor, the pallet comprising a plurality of receptacles configured to receive one or more passenger seats and further comprising a first attachment means. Step 1220 is coupling a keel tension fitting to a keel beam of the aircraft and to an underside of the aircraft floor, the keel tension fitting configured to extend along an edge where the keel tension fitting meets the underside of the aircraft floor. Step 1230 is coupling the keel tension fitting to the pallet using the first attachment means. Step 1240 is coupling the one or more passenger seats to the pallet.

Figure 13:
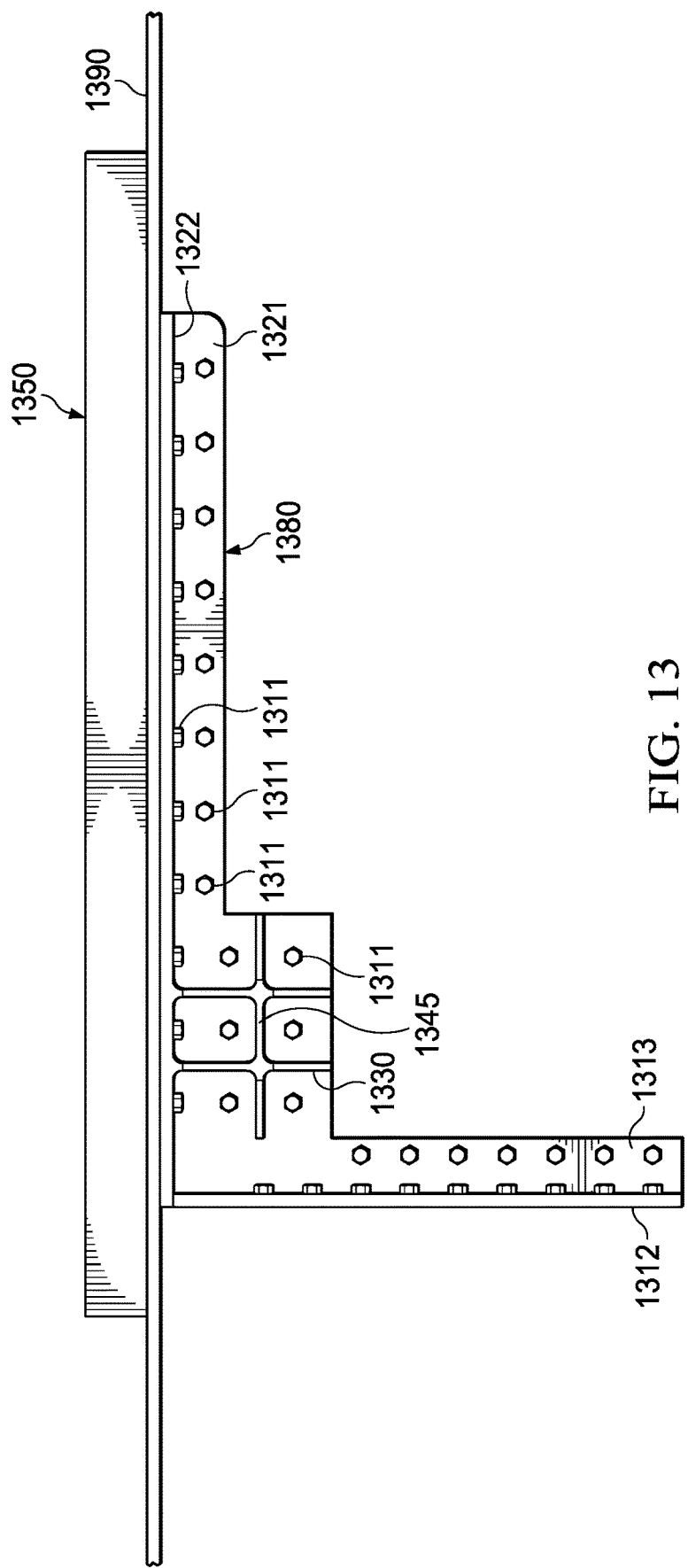
FIG. 13 is a diagram of a seating system under the present disclosure.

A further possible embodiment of a keel tension fitting 1380 and pallet 1350 can be seen in FIG. 13. Keel tension fitting 1380 can be coupled to a keel beam (not shown) by a plurality of bolts 1311 in vertical flange 1321 and 1313. Bulkhead flange 1312 and bolts 1311 can be used for coupling to a bulkhead (not shown). Horizontal flange 1322 can be used for coupling keel tension fitting 1380 to floor 1390 and pallet 1350. Vertical ribs 1330 and horizontal rib 1345 can provide added strength against shear and other forces. Seats can be attached to pallet 1350 by an appropriate track, receptacle, or any appropriate attachment mechanisms.

Description of coupling mechanisms between keel tension fittings, pallets, floors, and other brackets has included bolts. But a variety of coupling mechanisms are possible. Hex bolts, set screws, shoulder bolts, machine screws, socket screws, clamps, hooks, U-bolts, sauntering, welding, bolts, nuts, screws, hemming, interlocking folds, and other means of coupling and attaching are all compatible with the teachings of the present disclosure.

The present disclosure has generally been described as a pallet coupled to a top surface of a floor, and a keel tension fitting coupled to the floor from underneath. However, the floor of an aircraft may comprise multiple layers or structural components. Coupling a pallet to a floor and to a keel tension fitting may involve coupling (such as with bolts) other layers and additional components together depending on the aircraft. Bolting together the pallet and the keel tension fitting may create a "sandwich" with a pallet on top, keel tension fitting on bottom, and multiple components bolted between, including a machine strap, other brackets, aircraft floor, or other components or brackets.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method of securing passenger seats to an aircraft, comprising:
   providing a pallet comprising a first attachment means;
   attaching the pallet to an aircraft floor with the first attachment means;
   coupling a keel tension fitting to a keel beam of the aircraft and to an underside of the aircraft floor, the keel tension fitting configured to be coupled to the first attachment means of the pallet; and
   coupling a machine strap to the aircraft floor and the pallet such that the machine strap sits at least partially between the aircraft floor and the pallet.

2. The method of claim 1, wherein the keel tension fitting is further configured to be coupled to a bulkhead of the aircraft.

3. The method of claim 1, wherein the keel tension fitting comprises one or more vertical ribs and one or more horizontal ribs.

4. The method of claim 1, wherein the keel tension fitting comprises a vertical flange for coupling to the keel beam and a horizontal flange for coupling to the underside of the aircraft floor.

5. The method of claim 1, wherein the keel tension fitting is configured to extend both fore and aft of a bulkhead of the aircraft.

6. The method of claim 1, wherein the aircraft floor is coupled to the pallet and to the keel tension fitting by the first attachment means.

7. The method of claim 1, wherein the first attachment means comprises one or more bolts.

* * * * *